United States Patent [19]
Dart et al.

[11] 3,874,376
[45] Apr. 1, 1975

[54] PHOTOCURABLE RESIN IMPREGNATED FABRIC FOR FORMING RIGID ORTHOPAEDIC DEVICES AND METHOD

[75] Inventors: Edward Charles Dart; Antony Robert Perry; Josef Nemcek, all of Runcorn, England

[73] Assignee: Imperial Chemical Industries Limited, London, England

[22] Filed: Nov. 17, 1972

[21] Appl. No.: 307,528

[52] U.S. Cl............ 128/90, 204/159.15, 204/159.23
[51] Int. Cl. ............................................. A61f 13/04
[58] Field of Search .......... 128/90, 89; 204/159.24, 204/159.23, 159.19, 159.15

[56] References Cited
UNITED STATES PATENTS

| | | | |
|---|---|---|---|
| 2,367,660 | 1/1945 | Agre | 204/159.23 |
| 3,254,068 | 5/1966 | Furrow | 204/159.23 |
| 3,278,304 | 10/1966 | Conix et al. | 204/159.23 |
| 3,368,900 | 2/1968 | Burg | 204/159.23 |
| 3,421,501 | 1/1969 | Beightol | 128/90 |
| 3,495,987 | 2/1970 | Moore | 204/159.15 |
| 3,613,675 | 10/1971 | Larsen et al. | 128/90 |
| 3,625,744 | 12/1971 | Juna et al. | 204/159.23 |
| 3,628,963 | 12/1971 | Akamatsu et al. | 204/159.19 |
| 3,650,669 | 3/1972 | Osborn et al. | 204/159.23 |
| 3,719,728 | 3/1973 | Mirnada | 204/159.19 |
| 3,742,089 | 6/1973 | Schroeter | 204/159.19 |

*Primary Examiner*—Richard A. Gaudet
*Assistant Examiner*—J. Yasko
*Attorney, Agent, or Firm*—Cushman, Darby & Cushman

[57] ABSTRACT

A fabric article, for example a bandage, suitable for applying to a body member, the fabric article being impregnated with at least one curable organic material, for example, a material consisting of or containing a polymerizable ethylenically unsaturated material, and at least one photosensitive catalyst comprising at least one photosensitizer activatable by visible light, the photosensitive catalyst being capable of curing the organic material so as to convert the impregnated fabric article into an immobilizing orthopaedic device upon exposure of the impregnated fabric article to visible light.

27 Claims, No Drawings

PHOTOCURABLE RESIN IMPREGNATED FABRIC FOR FORMING RIGID ORTHOPAEDIC DEVICES AND METHOD

This invention relates to a fabric article suitable for applying to a body member, which member may be in a human being or an animal, and to an orthopaedic device which is produced from the fabric article and which is capable of immobilising the body member.

Hitherto, a body member, by which we mean a part of the body which may be immobilised by means of an externally applied device, for example, the neck, or a limb, for example, an arm, leg or finger, has generally been immobilised by applying to the body member a Plaster-of-Paris bandage which is subsequently dried to form an immobilising orthopaedic device, e.g., a cast. Such bandages are wet and are somewhat messy to apply and suffer from the disadvantages that the resultant casts are heavy, and are thus uncomfortable to wear, and are generally impermeable to X-rays so that if the body member is to be examined by X-rays the cast must first be removed from the body member. In some cases, when the cast has been removed it may be found that the body member has not healed sufficiently and it may then be necessary to reapply a bandage to the body member and reform a cast. Clearly, this is inconvenient.

It has been proposed to overcome the above mentioned disadvantages by using orthopaedic devices, e.g., casts, of a plastics material. The plastics material may be applied to the body member in the form of, for example, a fabric article impregnated with a polymerisable material, the polymerisable material subsequently being polymerised to form the immobilising orthopaedic device. However, although such fabric articles may not be as wet and messy to apply as Plaster-of-Paris bandages and, when formed into an orthopaedic device may be permeable to X-rays, the fabric articles suffer from further disadvantages. Thus, it may be necessary, in order to produce an immobilizing device in a reasonable length of time, to polymerize the material with which the article is impregnated by heating the fabric article when in position on the body member. Clearly, this may lead to discomfort, and possibly substantial discomfort, to the wearer of the fabric article. On the other hand, if the fabric article which is impregnated with polymerizable material contains a polymerization catalyst which does not require heating in order to effect polymerization then there is a danger that the fabric article will not be storage stable and in particular may tend to become rigid and thus unusable on storage due to premature polymerization of the polymerizable material.

It has further been proposed to overcome the latter above-mentioned disadvantages by effecting the polymerization of the material on the impregnated fabric article by exposing the article to ultra-violet radiation. However, the use of ultraviolet radiation suffers from the further disadvantage that it is known to be harmful to the human eye and when using ultraviolet radiation it may be necessary to take considerable care to shield the patient and the operator from the radiation during use of the impregnated fabric article in the production of an immobilizing orthopaedic device.

We now provide a fabric article suitable for application to a body member and from which an immobilizing orthopaedic device permeable to X-rays may be produced in which the above mentioned disadvantages are substantially overcome, and in particular which is storage stable and which avoids the use of heat and ultraviolet radiation in the production of the orthopaedic device.

The present invention provides a fabric article suitable for applying to a body member, said fabric article being impregnated with at least one curable organic material and at least on photosensitive catalyst comprising at least one photosensitizer, the photosensitive catalyst being capable of curing the organic material to convert the impregnated fabric article into an immobilizing orthopaedic device upon exposure of the fabric article to visible light.

By using visible light to effect the cure of the organic material to produce the immobilizing orthopaedic device it is in general unnecessary to excercise the same degree of care in shielding the patient and operator from the source of light as is necessary in the case where the organic material is cured by exposure to ultraviolet radiation. Consequently, the use of visible light is more convenient, particularly for the operator. Furthermore, the orthopaedic devices produced from the impregnated fabric articles of the present invention are generally lightweight and thus are convenient to wear, and are in general permeable to X-rays.

The use of visible light sources means that relatively cheap and readily available sources of light may be used compared with the case where ultraviolet radiation is used.

By curable organic material we mean an organic material which is capable of reacting to produce a stiff, rigid material.

The fabric article may be woven or non-woven, for example, it may be knitted, and it may be made from any desired material which is capable of being impregnated by, and which is thus capable of acting as a carrier for, the organic material. The fabric article should not be adversely affected by the organic material. For example, the organic material should not be capable of dissolving the fabric to any significant extent.

It is preferred that the fabric article has an open structure, the openings in the structure being of a size such that they are not closed after the fabric is impregnated with the organic material. An open structure aids breathability of the resultant immobilizing orthopaedic device.

The fabric article may be made, for example, of cotton or rayon, or of a synthetic polymeric material, for example, nylon or poly(ethylene terephthalate). Preferably, the fabric article is made of glass fibre, especially in the form of an open structured woven or knitted material.

The fabric article may have any suitable shape such that it may be applied to and support and/or enclose the part of the body member which it is desired to immobilize. Suitably, the fabric article may be in the form of a bandage, that is, the article may have a length substantially greater than its width, and the bandage may suitably be wound around and thus enclose the body member.

The fabric article may be impregnated with the curable organic material by contacting the fabric article with a liquid composition containing or consisting essentially of the organic material. The curable organic material may be a liquid or solid material. Where the organic material is itself liquid the fabric article may be contacted with the organic material itself. Alternatively, and especially where the organic material is a solid or a viscous liquid, the fabric article may be contacted with a solution of the organic material in a suitable diluent. The photosensitive catalyst, which may be present in the liquid composition before the fabric article is impregnated, is desirably soluble in the organic material. The fabric article, especially where it is in the form of a bandage, may be passed through a bath of the liquid composition containing or consisting essentially of the curable organic material, or the liquid composition may be sprayed on or poured onto the fabric article. Excess organic material may be removed from the fabric article, for example, by allowing the article to drain or by squeezing the article, e.g., by passing the article into the nip between a pair of rollers. Alternatively, excess organic material may be removed from the fabric article by passing a blade over the surface of the article. The diluent, if used, may be removed by evaporation.

When the fabric article is in the form of a bandage it may be applied to the body member by winding around the member, preferably with overlapping of the bandages. As many layers of fabric as desired may be used. However, we prefer to use, for example, two to four layers as with a greater number of layers the organic material on the lower layers may take an unacceptably long time to cure.

After the fabric article has been applied to the body member the article may be exposed to a source of visible light having a wavelength which is absorbed by the photosensitiser and which is capable of activating the photosensitizer and thus curing the organic material. The organic material with which the fabric article is impregnated may thus be cured to form an immobilizing orthopaedic device on the body member.

By visible light we mean light having a wavelength in the range of 4,000 A to 7,500 A.

Suitable sources of visible light include for example, sources of blue light, daylight fluorescent tubes and tungsten-halogen lamps. Where a light source emits both ultraviolet radiation and visible light the ultraviolet radiation may, if desired, be filtered out, e.g., by including a suitable filter as part of the casing of the light source.

Before the impregnated fabric article is applied to the body member the body member may be wrapped in a protective material, e.g., a sleeve or the like, in order to protect the member from the curable organic material. The sleeve or the like, which may, for example, be of polyethylene, polypropylene or cotton, may remain in position on the body member after curing of the organic material has been effected in order to produce the immobilizing orthopaedic device, or it may be removed from the body member after the immobilizing orthopaedic device has been produced.

The amount of organic material impregnated onto the fabric article should be such that after application to a body member and curing of the organic material has been effected the orthopaedic device thereby produced is sufficiently hard and rigid to immobilize the body member to the desired extent.

Suitable amounts of organic material to be used will readily be determined by means of simple experiment and by reference to the examples at the end of this specification. However, we have found that a suitable amount is between 10 and 60 percent of curable organic material by weight of the impregnated fabric article, more preferably between 20 and 50 percent of curable organic material by weight of the impregnated fabric article, although amounts outside these ranges may be used if desired. The proportion of organic material to be used will depend on the thickness of the fabric article and on the number of layers of fabric article applied to the body member, in general, the greater the number of layers the less will be the amount of curable organic material required to produce an orthopaedic device of a given strength.

Although the disadvantages of the hitherto proposed methods of cure are substantially overcome by using visible light to effect the cure of the organic material on the impregnated fabric article it is to be understood that, where the photosensitizer in the photosensitive catalyst absorbs ultraviolet radiation and is thus also activatable by ultraviolet radiation, the organic material may be cured by exposure to ultraviolet radiation, if desired, or by exposure to radiation having wavelengths in the ultraviolet and visible regions of the spectrum, e.g., sunlight.

The positioning of the light sources will depend on the particular body member which is to be immobilized. For example, where the body member is an arm or leg the light sources may suitably consist of a plurality of lamps, for example, in the shape of tubes, positioned lengthwise with respect to each other so as to define a cylinder in which the body member may be positioned.

The time required to produce an immobilizing orthopaedic device will depend, inter alia, on the intensity of the visible light used, on the nature of the photosensitive catalyst and on the nature of the curable organic material, on the amount of curable organic material on the fabric article, and on the concentration of photosensitizer in the curable organic material. We have found that with the impregnated fabric articles of the present invention it is possible to produce immobilizing orthopaedic devices after 2 to 3 minutes irradiation with visible light, although longer times may be necessary in some circumstances.

As the organic material containing the photosensitive catalyst is sensitive to and is curable on exposure to visible light it may be advantageous, in order to decrease the possibility of premature curing of the material, for the impregnation of the fabric article to be effected in subdued light.

The photosensitive catalyst is desirably chosen such that the fabric article impregnated with a curable organic material and a photosensitive catalyst is stable in the dark such that little if any premature curing of the organic material takes place.

In order to shield the impregnated fabric article from visible light it is desirably stored between layers of a film-like material, e.g., polyethylene, and also in containers which are substantially light-tight. Storage between layers of a film-like material also assists to decrease the amount of organic material which may be lost by evaporation. Evaporation losses and premature curing may also be decreased by storing the impregnated fabric article at a temperature below ambient, e.g., at or near 0°C.

The curable organic material may consist of or comprise a polymerisable ethylenically unsaturated material. For example, the material may consist of or comprise one or more polymerizable ethylenically unsaturated monomers, e.g., one or more vinyl monomers having ethylenic unsaturation in a terminal group which are polymerizable to a rigid material.

Suitable vinyl monomers include, for example, vinyl esters and aromatic vinyl compounds.

Vinyl esters which may be used include, for example, vinyl acetate and esters of acrylic acid having the structure $CH_2 = CH — COOR$, where R is an alkyl, aryl, alkaryl, aralkyl or cycloalkyl group. For example, R may be an alkyl group having from 1 to 20, and preferably 1 to 10 carbon atoms. Particular vinyl esters which may be mentioned include, for example, methyl acrylate, ethyl acrylate, and n- and isopropylacrylates.

Other suitable vinyl esters include, for example, esters of the formula $CH_2 = C(R_1)COOR$, where $R_1$ is methyl.

In the ester of formula $CH_2 = C(R_1)COOR$, R and $R_1$ may be the same or different. Particular vinyl esters which may be mentioned include, for example, methyl methacrylate, ethyl methacrylate, and n- and isopropylmethacrylate. Suitable aromatic vinyl compounds include, for example styrene and derivatives thereof, e.g., tertiary butyl styrene and $\alpha$-alkyl derivatives of styrene e.g., $\alpha$-methyl styrene, and vinyl toluene.

Other suitable vinyl monomers include hydroxyalkyl acrylates and methacrylates, e.g., hydroxyethyl acrylate, hydroxypropylacrylate, hydroxyethyl methacrylate and hydroxypropylmethacrylate.

The vinyl monomer may be polyfunctional, that is, it may contain two or more ethylenically unsaturated groups per molecule. The polyfunctional vinyl monomer may be used alone or in combination with at least one monofunctional vinyl monomer, polymerization of the monomer or mixture of monomers producing a cross-linked polymeric product. Suitable polyfunctional vinyl monomers include divinyl benzene and glycol dimethacrylate and a vinyl-ended compound prepared by reacting an isocyanate-ended urethane prepolymer with a vinyl monomer containing and isocyanate-reactive group.

It is preferred that the organic material should have a viscosity such that, when impregnated onto the fabric article, it is not so mobile that it runs off the fabric article, and furthermore, it is preferred that impregnated fabric article is not so sticky and tacky that it is unpleasant or awkward to use. For these reasons a polymerizable ethylenically unsaturated monomer or mixture of such monomers may not be particularly suitable.

In order to provide an organic material having greater viscosity and which is thus less mobile and which has less tendency to run off the fabric article, the curable material may comprise a mixture, preferably a solution, of at least one polymeric material and at least one polymerizable ethylenically unsaturated monomer. For example, the polymerizable ethylenically unsaturated monomer may be any of the vinyl monomers hereinbefore referred to and the polymer may be a polymer of any of the polymerizable vinyl monomers hereinbefore referred to. The concentration of the polymer in the monomer may be chosen to give a mixture having the desired viscosity. Suitably, in a mixture comprising polymer and monomer the polymer and monomer may be used in admixture in proportion of parts by weight in the range polymer:monomer of 10:90 to 80:20, preferably 20:80 to 60:40. For example, the organic material may be a solution of poly(methacrylate) in methyl methacrylate.

Preferred organic materials include polymeric materials having a plurality of ethylenically unsaturated groups in admixture with at least one ethylenically unsaturated monomer copolymerizable with the ethylenically unsaturated groups in the polymeric material. In particular there may be mentioned a mixture of ethylenically unsaturated polyester and an ethylenically unsaturated monomer.

The ethylenically unsaturated monomer may be any of the vinyl monomers hereinbefore described and the ethylenically unsaturated polyester may be made by condensing an ethylenically unsaturated dicarboxylic acid or anhydride, optionally in admixture with a saturated dicarboxylic acid or anhydride, with a saturated diol, optionally in admixture with an ethylenically unsaturated diol. Small amounts of polycarboxylic acids and/or polyols having a functionality of greater than two may be used if desired.

Suitable ethylenically unsaturated acids or anhydrides include, for example, maleic acid and anhydride, fumaric acid and itaconic acid. Suitable saturated dicarboxylic acids include isophthalic acid and terephthalic acid. The diol may be, for example, ethylene glycol, propylene glycol, butylene glycol, di(ethylene glycol), or di(propylene glycol).

The photosensitizer in the photosensitive catalyst should be capable of curing the curable organic material upon exposure of the impregnated fabric article to visible light.

Suitable photosensitizers activatable by visible light include, for example, uranyl compounds and especially ionisable uranyl salts. The visible light used to activate the uranyl compound photosensitiser may suitably be in the range 4,000 A to 6,000 A.

Suitable uranyl compounds include, for example uranyl salts of inorganic acids, e.g., uranyl nitrate, uranyl sulphate, and uranyl halides, e.g., uranyl chloride and uranyl iodide, and uranyl 2-ethyl hexyl phosphate; and uranyl salts of organic acids, for example, salts of monobasic or dibasic acids, e.g., salts of fumaric acid, acetic acid, propionic acid, butyric acid, glutaric acid, benzoic acid, oxalic acid and succinic acid.

The photosensitive catalyst may comprise a uranyl compound as photosensitizer and an activator which leads to an increase in the rate at which the organic material may be cured. The activator may be, for example, an alcohol in which the hyroxyl group is not directly attached to an aromatic group, e.g., methanol, ethanol, propanol or butanol; an aldehyde, e.g., acetaldehyde, propionaldehyde or butyraldehyde; or an ether, e.g., diethyl ether, dipropyl ether or a cyclic ether, e.g., ethylene oxide, propylene oxide or tetrahydrofuran.

The photosensitizer may be, for example, manganese carbonyl and an organic halide, e.g., carbon tetrachloride, carbon tetrabromide, trichloroacetic acid or tribromoacetic acid or an ester of said acids.

The photosensitiser in the photosensitive catalyst may be a photosensitive dye, e.g., rose bengal, eosein, erythrosin or phloxin, the visible light which is used having a wavelength which is absorbed by the dye and which activates the dye.

A preferred photosensitizer for use in the photosensitive catalyst is fluorenone or an $\alpha$-diketone having the structure

where the groups A, which may be the same or different, are hydrocarbyl or substituted hydrocarbyl groups. The aforementioned photosensitizers are preferred on account of the rapid rates of cure which may be obtained using the said photosensitizers and on account of their relative insensitivity to the presence of oxygen.

Light having a wavelength in the range 4,000 A to 5,000 A may suitably be used to activate the latter photosensitizers.

In the α-diketone having the structure

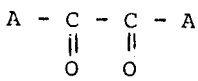

the groups A, when hydrocarbyl, may be, for example, aliphatic, e.g., alkyl having from 1 to 10 carbon atoms; aromatic, e.g., phenyl; cycloaliphatic, e.g., cyclohexyl; aralkyl, e.g., benzyl; or alkaryl, e.g., tolyl.

Alternatively, the groups A may together form a divalent radical such that in the photosensitizer the groups A together with the carbonyl groups form a cyclic structure. For example, the groups A may form a divalent aliphatic group, or they may form an aromatic group, and in particular may form a fused aromatic ring system.

For example, the groups A may be methyl in which case the photosensitiser is biacetyl, phenyl in which case the photosensitizer is benzil, α-naphthyl or β-naphthyl in which case the photosensitizer is α-naphthil or β-naphthil respectively, or alkaryl, e.g., tolyl, in which case the photosensitizer is tolil, e.g., p-tolil.

Where the groups A form a divalent aliphatic group the photosensitizer may be camphorquinone and where the groups A form a fused aromatic ring system the photosensitizer may be acenaphthene quinone.

Where the groups A are substituted hydrocarbyl the substituent group or groups should not result in substantial inhibition of the rate of cure of the curable organic material. Examples of suitable photosensitizers in which the groups A are substituted hydrocarbyl include p,p'-dimethoxy benzil and p,p'-dihalobenzil, e.g., p,p'-dichlorobenzil.

The groups A, when aromatic, may be benzenoid aromatic group, e.g., phenyl groups, or they may be non-benzenoid cyclic groups which are recognized in the art as processing the characteristics of benzenoid aromatic groups. A suitable non-benzenoid aromatic group A is the group

For example, the photosensitizer may be furil.

We have found that the rate at which the organic material may be cured is increased where the photosensitive catalyst comprises fluorenone or an α-diketone as described together with a reducing agent which is capable of reducing the photosensitizer when the photosensitizer is in an activated state.

The reducing agent should have a reduction potential such that it is capable of reducing the photosensitizer when the photosensitizer is in an activated state yet is incapable of reducing the photosensitizer when the latter is not activated by the visible light. Furthermore, it is believed the reducing agent, when oxidized by the activated photosensitizer, should be capable of initiating cure of the organic material, for example, it should be capable of initiating polymerization of the ethylenically unsaturated monomer where the organic material includes such a monomer. The reducing agent, at the concentration at which it is present in the curable organic material should have little or no inhibiting effect on polymerization. Whether or not a reducing agent has an inhibiting effect may be determined by means of simple experiment, for example, by effecting cure of the organic material by means of a thermal initiator in the presence of, and in the absence of, a reducing agent in the desired concentration and comparing the rates of cure in the presence and absence of the reducing agent.

Suitable reducing agents include compounds having the structure

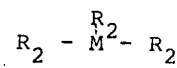

where M is an element of Group Vb of the Periodic Table of the Elements and the units $R_2$, which may be the same or different, are hydrogen atoms, hydrocarbyl groups, substituted hydrocarbyl groups or groups in which two units $R_2$ together with the element M form a cyclic ring system, no more than two of the units $R_2$ being hydrogen atoms, and where the element M is attached directly to an aromatic group $R_2$, at least one of the groups $R_2$ has a

group attached to M.

The Periodic Table of the Elements referred to is that published in "Advanced Inorganic Chemistry," second edition, by F. A. Cotton and G. Wilkinson (Interscience 1966).

Preferably, the reducing agent having the structure

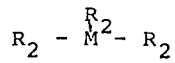

is free of aromatic groups attached directly to the element M.

The element M in the reducing agent may be, for example, phosphorous or more preferably nitrogen. If desired, M may be arsenic or antimony.

The reducing agent may be primary, secondary or tertiary that is, in the structure

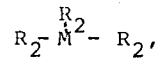

two, one or none of the units $R_2$ respectively may be hydrogen atoms. For example, the reducing agent may be a primary, secondary or tertiary amine or phosphine.

One or more of the groups $R_2$ may be hydrocarbyl. The hydrocarbyl group may be, for example, alkyl, cycloalkyl or alkaryl. Suitably, the group $R_2$ may be an alkyl group having from 1 to 10 carbon atoms.

Examples of suitable reducing agents in which one or more of the units $R_2$ is hydrocarbyl include propylamine, n-butylamine, pentylamine, hexylamine, dimethylamine, diethylamine, dipropylamine, di-n-butylamine, dipentylamine, trimethylamine, triethylamine, tripropylamine, tri-n-butylamine, tripentylamine, dimethylaminoethyl methacrylate, dimethylamino alcohols, e.g., dimethylamino ethanol, and dimethylamino propanol, and long chain fatty amines, e.g., $C_{18}H_{37}NMe_2$. Examples of reducing agents containing aromatic groups include N,N'-dimethyl aniline and N-methyl diphenylamine.

It is to be understood that where we refer to specific examples of suitable reducing agents in which the element M is nitrogen we also wish to include corresponding specific examples in which the element M is phosphorous, arsenic or antimony.

One or more of the units $R_2$ may be substituted hydrocarbyl group and in particular the hydrocarbyl group may carry a substituent having the structure

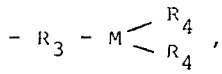

where M is an element of Group Vb of the Perodic Table of the Elements and the unit $R_3$ is, for example, an alkylene chain and the units $R_4$, which may be the same or different, are for example, hydrogen atoms or hydrocarbyl groups.

Examples of reducing agents having the structure

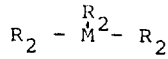

in which at least one of the units $R_2$ is a substituted hydrocarbyl group include diamines of the structure

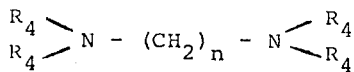

in which $n$ is a whole number of at least two and the groups $R_4$ which may be the same or different, are hydrogen atoms or hydrocarbyl, especially alkyl groups. For example, the reducing agent may be ethylene diamine, trimethylene diamine, tetramethylene diamine, pentamethylene diamine or hexamethylene diamine, or N-hydrocarbyl, especially N-alkyl derivatives thereof. Other suitable reducing agents include derivatives having the structure

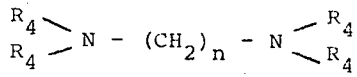

in which one or more of the hydrogen atoms in the $-CH_2$ unit are substituted by an

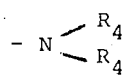

group, especially an $-NH_2$ group.

Examples of reducing agents in which the element M forms part of a cyclic ring system include peperidine, and N-hydrocarbyl, especially N-alkyl, derivatives of piperidine.

Other reducing agents include triallylamine,

allyl thiourea, o-tolyl thiourea, soluble salts of aromatic sulphinic acids, e.g., S-benzyl iso-thiuronium p-toluene sulphinate, and sodium diethyl dithiophosphate.

One or more of the aforementioned reducing agents may be used in combination with one or more of the aforementioned uranyl compound photosensitisers or with one or more of the aforementioned photosensitive dyes in order to accelerate the rate at which the uranyl compound or photosensitive dye is able to effect cure of the organic material on irradiation with visible light.

Suitably, the concentration of the photosensitizer in the photosensitive catalyst is in the range 0.01 to 5 percent or even 10 percent by weight of the curable organic material and, where the catalyst contains a reducing agent, the concentration of the reducing agent is suitably in the range 1 to 5 percent by weight of the curable organic material, although concentrations of photosensitizer and reducing agent outside these ranges may be used if desired.

Similarly, where the photosensitive catalyst comprises a uranyl compound and an activator which is an alcohol in which the hydroxyl group is not attached directly to an aromatic group, an aldehyde or an ether, the activator may suitably be used in concentration of 1 to 5 percent by weight of the curable organic material.

The curable organic material with which the fabric article is impregnated may contain a pigment provided that the pigment does not absorb visible light to an excessive extent at the wavelength at which the photosensitizer in the photosensitive catalyst absorbs light and is thus activated. Preferably, the pigment should be transparent to visible light at the wavelength at which the photosensitizer is activated.

The pigment may be white, and may be, for example $TiO_2$, in which case the resultant immobilizing orthopaedic device will be white. Alternatively colored pigments may be used. For example, we have found that where benzil is used as the photosensitizer in the photosensitive catalyst it is possible to use pigments which give a red, yellow, green or blue color to the immobilizing orthopaedic device.

Suitably, pigments are used in a concentration of up to 3 percent by weight of the curable organic material, and preferably in a concentration of 1 percent or less by weight of the curable organic material.

The curable organic material with which the fabric article is impregnated may contain a filler, for example, calcium carbonate or kaolin which may serve to make the impregnated fabric article less sticky and thus more convenient to handle.

Although the fabric article of the present invention which is impregnated with a curable organic material is intended for use in the production of an immobilizing orthopaedic device it is to be understood that the article may be used in applications other than orthopaedic applications.

The invention is now illustrated by the following Examples in which all parts are expressed as parts by weight.

EXAMPLE 1

A photosensitive catalyst of 1.25 parts of benzil and 2.5 parts of dimethylaminoethyl methacrylate was dissolved in 5 parts of acetone and charged to a solution of 38.7 parts of an ethylenically unsaturated polyester and 23.7 parts of styrene. The polyester was a condensation product of propylene glycol, fumaric acid and isophthalic acid (fumaric acid:isophthalic acid molar proportion 3:1), the product having a hydroxyl value of 40.3 mg KOH $g^{-1}$ and an acid value of 4.5 mg. KOH $g^{-1}$.

A 2 in. wide cotton bandage was impregnated by immersing the bandage in the solution for 2 minutes and the bandage was then removed and the excess solution allowed to drain off. The solution formed 76 percent by weight of the impregnated bandage. The bandage was then wound onto a cylindrical mandrel with overlapping of the bandage. The mandrel had a diameter of 1.7 in. A 6 in. length of a mandrel was covered by the bandage the thickness of the bandage varying between 3 and 4 layers.

The bandage was then irradiated for 3 minutes with a light source comprising eight 20 watt blue light fluorescent tubes having a maximum emission at 4300 A and emitting ultraviolet radiation and visible light, (Thorn Lighting Limited) each tube having dimensions 2 ft. long by 1.5 in. diameter, the tubes being arranged lengthwise with respect to each other so as to define a cylinder having a diameter of 6 in. The bandage on the mandrel was inserted into the cylinder defined by the lamps. After irradiation the resultant cast was removed from the mandrel by sliding it off the mandrel.

The impregnated bandage was found to have cured to a rigid, non-tacky cast.

EXAMPLE 2

The procedure of Example 1 was followed except that the photosensitive catalyst which was used comprised 0.4 part of uranyl nitrate hexahydrate (in place of the benzil) and 0.8 part of dimethylaminoethyl methacrylate dissolved in 10 parts of acetone and a solution of 12.4 parts of unsaturated polyester in 7.6 parts of styrene was used. In place of the cotton bandage the bandage used was a 2 in. wide woven glass fiber bandage (New Tean Hall Mills). The solution formed 28 percent by weight of the impregnated bandage.

The impregnated bandage was wound onto the mandrel to form a double thickness and the bandage was irradiated for 8 minutes. After removal from the light source as used in Example 1 the impregnated bandage was found to have cured to a rigid non-tacky cast.

EXAMPLE 3

An impregnated bandage was produced following the procedure of Example 1 except that the photosensitive catalyst comprised 0.6 part of benzil and 1.2 parts of dimethylaminoethyl methacrylate dissolved in 10 parts acetone. The catalyst was added to a solution of 20.3 parts of unsaturated polyester and 12.4 parts of styrene and the bandage used was 7 in. wide warp knitted bandage of poly-(ethylene terephthalate). The solution formed 54 percent by weight of the impregnated bandage.

The impregnated bandage was wound on a mandrel following the procedure of Example 2 and irradiated for 5 minutes. After removal from the light source as used in Example 1 the bandage was found to have cured to a rigid non-tacky cast.

EXAMPLE 4

An impregnated bandage was produced following the procedure of Example 1 except that the photosensitive catalyst comprised 0.4 parts of benzil and 0.8 part of dimethylaminoethyl methacrylate dissolved in 15 parts of acetone. The catalyst was added to a solution of 15 parts of unsaturated polyester and 5 parts of vinyl toluene (in place of the styrene of Example 1), and the bandage used was a 2 in. wide weft knitted bandage of poly(ethylene terephalate). The solution formed 47 percent by weight of the impregnated bandage.

The impregnated bandage was wound on a mandrel following the procedure of Example 2 and the bandage was irradiated for 5 minutes. After removal from the light source as used in Example 1 the bandage was found to have cured to a hardened, rigid, non-tacky cast which became more rigid over a period of 30 minutes.

EXAMPLE 5

The procedure of Example 4 was followed except the bandage used was a 2 in. wide weft knitted glass fiber bandage (BDS Industrial Fabrics). The solution formed 37 percent by weight of the impregnated bandage, and the bandage on the mandrel was irradiated for 3 minutes. After removal from the light source as used in Example 1 the bandage was found to have cured to a hardened, rigid, non-tacky cast which became more rigid over a period of 30 minutes.

EXAMPLE 6

An impregnated bandage was produced following the procedure of Example 1 except that a photosensitive catalyst of 0.26 part of benzil and 0.52 part of dimethylaminoethyl methacrylate dissolved in 10 parts of acetone was used. The catalyst was added to a solution of 10 parts of unsaturated polyester and 3.3 parts of vinyl toluene (in place of the styrene of Example 1) and the bandage used was a 2 in. wide woven glass fiber bandage as used in Example 2. The solution formed 25 percent by weight of the impregnated bandage.

The impregnated bandage was wound on to a mandrel following the procedure of Example 2 and the bandage was irradiated with the light source as used in Example 1 for 3 minutes to produce a rigid non-tacky cast.

EXAMPLE 7

An impregnated bandage was produced following the procedure of Example 1 except that a photosensitive catalyst of 0.2 part of benzil and 0.5 part of $N,N^1,N^1$,-tetramethyl ethylene diamine dissolved in 10.5 parts of acetone was used. The catalyst was added to a solution of 10.5 parts of unsaturated polyester and 7 parts of vinyl toluene (in place of the styrene of Example 1), and the bandage used was a 2 in. wide woven glass fibre bandage as used in Example 2. The solution formed 22 percent by weight of the impregnated bandage.

The impregnated bandage was wound on a mandrel following the procedure of Example 2 and the bandage was irradiated for 3 minutes with the light source as used in Example 1 to produce a rigid non-tacky cast.

EXAMPLE 8

An impregnated bandage was produced following the procedure of Example 1 except that a photosensitive catalyst of 0.02 part of benzil and 0.4 part of 2-dimethylaminopropan-2-ol dissolved in 10 parts of acetone was used. The catalyst was added to a soltuion of 10 parts of unsaturated polyester and 3.3 parts of vinyl toluene (in place of the styrene of Example 1), and the bandage used was a woven glass fiber bandage as used in Example 2. The solution formed 26 percent by weight of the impregnated bandage.

The impregnated bandage was wound on a mandrel following the procedure of Example 2 and the bandage was irradiated for 3 minutes with the light source as used in Example 1 to produce a rigid non-tacky cast.

EXAMPLE 9

An impregnated bandage was produced following the procedure of Example 1 except that a photosensitive catalyst of 0.2 part of benzil and 0.4 part of dimethyl aminoethyl methacrylate dissolved in 10 parts of acetone was used. The catalyst was added to a solution of 10 parts of unsaturated polyester, 3.3 parts of divinyl benzene and 2.6 parts of ethyl styrene (in place of the styrene used in Example 1) and the bandage used was a woven glass fiber bandage as used in Example 2. The solution formed 22 percent by weight of the impregnated bandage.

The impregnated bandage was wound on a mandrel following the procedure of Example 2 and the bandage was irradiated for 15 minutes with a light source as used in Example 1 to produce a rigid non-tacky cast.

EXAMPLE 10

The procedure of Example 9 was followed except that the divinyl benzene and the ethyl styrene were replaced by 3.3 parts of p-tertiary butyl styrene. The solution formed 22 percent by weight of the impregnated bandage and the bandage was irradiated with a light source as used in Example 1 for 3 minutes to produce a rigid non-tacky cast.

EXAMPLE 11

The procedure of Example 9 was followed except that the divinyl benzene and ethyl styrene were replaced by 1.65 parts of methyl methacrylate and 1.65 parts of styrene. The solution formed 15 percent by weight of the impregnated bandage and the bandage was irradiated for 3 minutes with a light source as used in Example 1 to produce a rigid non-tacky cast.

EXAMPLE 12

An impregnated bandage was produced following the procedure of Example 1 except that a photosensitive catalyst of 0.4 part of benzil and 0.8 part of dimethylaminoethyl methacrylate was used and 20 parts of a vinyl urethane was used in place of the unsaturated polyester and styrene. The bandage used was a woven glass fiber bandage as used in Example 2. The vinyl urethane formed 25 percent by weight of the impregnated bandage. The vinyl urethane was produced by reacting, in a molar proportion of 2:1, 4:4'-diphenylmethane diisocyanate and an oxypropylated bisphenol-A having the structure:

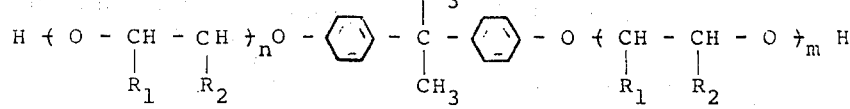

in which $n$ and $m$ are on average one, and one of $R_1$ and $R_2$ is H and the other is $CH_3$, and thereafter reacting, in a molar proportion of 2:1, the resultant isocyanate-ended product with 2-hydroxyethyl methacrylate.

The impregnated bandage was wound on a mandrel following the procedure of Example 2 and the bandage was irradiated for 20 minutes with the light source as used in Example 1 to produce a rigid non-tacky cast.

EXAMPLE 13

An impregnated bandage was produced following the procedure of Example 9 except that the benzil was replaced by fluoroenone and the divinyl benzene and ethyl styrene were replaced by 2.5 parts of vinyl toluene. The solution formed 19 percent by weight of the bandage and the bandage was irradiated for 5 minutes with the light sources as used in Example 1 to produce a rigid non-tacky cast.

EXAMPLE 14

A solution was made up comprising 25 parts of poly-(methyl methacrylate) (Diakon MO–900 Imperial Chemical Industries Limited), 75 parts of methyl methacrylate, 2 parts of benzil and 4 parts of dimethylaminoethyl methacrylate. A 2 in. wide woven glass fiber bandage as used in Example 2 was passed through the solution, the bandage was removed, and the excess solution was allowed to drain off. The solution formed 24 percent by weight of the impregnated bandage.

The bandage was wound onto a cylindrical mandrel having a diameter of 1½ in. The layers of bandage were overlapped to form two layers and the mandrel was placed between two banks of daylight tubes (Thorn Lighting Ltd.), each bank comprising 13 daylight tubes the banks of tubes being placed 15 in. apart. The tubes had a maximum emission at 5,800 A and emitted 98 percent of the radiation in the visible region of the spectrum. After irradiating for 30 minutes the resultant cast was removed from the mandrel by sliding it off the mandrel. The bandage was found to have cured to a rigid non-tacky cast.

EXAMPLE 15

The procedure of Example 1 was followed except that 31 parts of polyester, 19 parts of styrene and 12.5 parts of acetone were used, and in place of the benzil and dimethylaminoethyl methacrylate used in Example 1 there was used 1 part of uranyl nitrate hexahydrate and 2 parts of dimethylamino ethanol. In place of the cotton bandage as used in Example 1 there was used a glass fibre bandage as used in Example 2. The solution of polyester and styrene formed 31.5 percent by weight of the impregnated bandage.

The bandage was wound onto a mandrel and irradiated following the procedure of Example 14 to produce a rigid non-tacky cast.

EXAMPLE 16

The procedure of Example 15 was followed except that in place of the uranyl nitrate hexahydrate and dimethylaminoethanol there was used 0.125 part of fluorenone and 2 parts of dimethylamino propanol. The solution of polyester and styrene formed 33.5 percent by weight of the impregnated bandage.

After irradiation for 10 minutes a rigid non-tacky cast was produced.

EXAMPLE 17

In order to demonstrate that the impregnated bandage may include a pigment a solution of 57.2 parts of the polyester as used in Example 1, 28.3 parts of vinyl toluene, 28.5 parts of acetone, 2 parts of benzil and 4 parts of dimethylaminoethanol was made up and 0.85 part of $TiO_2$ was added to the solution. A glass fiber bandage as used in Example 2 was impregnated with the resultant mixture. The bandage was allowed to drain for 5 minutes. The solution of polyester and vinyl toluene formed 40% by weight of the impregnated bandage.

The bandage was wound onto a mandrel following the procedure of Example 14 and the bandage was irradiated with three 400 watt Tungsten-halogen lamps (Thorn Lighting Ltd.). The lamps emitted mainly visible light with a peak intensity at 4,150 A with a small amount of ultraviolet radiation.

After irradiation for 3 minutes a white, rigid, non-tacky cast was produced.

By way of comparison and in order to illustrate the effect of irradiation with ultraviolet radiation the above procedure was followed except that the bandage on the mandrel was irradiated by 162 ft. long 20 watt Black-light-Blue tubes (maximum emission at 3500 A) arranged to form a cylinder 8 in. in diameter.

After irradiation for 20 minutes the bandage on the mandrel was found to be soft and sticky and when removed from the mandrel the layers of bandage unwound. A rigid cast was not formed.

EXAMPLE 18

The procedure of Example 1 was followed except that 62 parts of polyester, 38 parts of styrene, 2 parts of benzil and, in place of the dimethylaminoethyl methacrylate, 4 parts of dimethylaminoethanol were used. In place of the cotton bandage of Example 1 a glass fiber bandage as used in Example 2 was used. The bandage wound on the mandrel was irradiated by one 400 watt tungsten-halogen lamp as used in Example 17. The lamp was placed 3 ft. from a parabolic reflector and the bandage on the mandrel was placed at the focal point of the reflector.

After irradiating for 2 minutes, a rigid non-tacky cast was produced.

By way of comparison and in order to illustrate the effect of using visible light with an ultraviolet sensitive photosensitizer the above procedure was repeated except that the benzil and dimethylaminoethanol were replaced by 2 parts of benzoin.

After irradiation for 20 minutes the bandage on the mandrel was soft and tacky and could be unwound. A rigid cast was not produced.

EXAMPLE 19

In order to illustrate the use of various pigments the procedure of Example 1 was followed except that 62 parts of polyester, 38 parts of styrene, 2 parts of benzil and 4 parts of dimethylaminoethyl methacrylate were used.

In separate experiments 0.3 part of a number of different pigments were included in the mixtures of polyester and styrene. A bandage as used in Example 2 was used.

The impregnated bandages comprised 60 percent by weight of the solution of polyester and styrene.

The following results were obtained.

| Pigment | Irradiation Time | Comment |
| --- | --- | --- |
| Red pigment (Crystic Red 5000) | 3 minutes | Rigid Cast |
| Blue pigment (Crystic Blue 107) | 5 minutes | Rigid Cast |
| Yellow pigment (Crystic yellow 3060) | 5 minutes | Rigid Cast |
| Green pigment (mixture of Crystic Blue 107 and Crystic Yellow 3060) | 3 minutes | Rigid Cast |

(Crystic is a Registered Trade Mark, Scott Bader and Co. Ltd.)

EXAMPLE 20

The procedure of Example 8 was followed in three separate experiments except that in place of the benzil there was used 0.2 part of $\alpha$-naphthil, 0.2 part of p-tolil and 0.2 part of camphorquinone respectively.

After irradiation with a light source as used in Example 1 rigid non-tacky casts were produced after irradiation for, respectively, 10 minutes, 3 minutes and 3 minutes.

EXAMPLE 21

The procedure of Example 17 was followed to make a glass fiber impregnated bandage except that 76.5 parts of the polyester, 37.8 parts of vinyl toluene, 1.7 parts of benzil, 3.4 parts of dimethylamino ethanol and 2.5 parts of $TiO_2$ were used. The solution of polyester and vinyl toluene formed 40 percent by weight of the impregnated bandage.

A polypropylene stockinette was applied to the wrist of a test subject and the impregnated bandage was wound around the waist over the stockinette.

The bandage was then irradiated for 4 minutes following the procedure of Example 17 to produce a non-tacky cast which supported and immobilized the wrist of the test subject.

We claim:

1. In an orthopaedic device forming fabric impregnated with at least one curable material, the improvement wherein the curable material comprises at least one curable organic material comprising a copolymerizable mixture of an ethylenically unsaturated polymer and an ethylenically unsaturated monomer and at least one photosensitive catalyst comprising at least one photosensitizer activatable by visible light having a wavelength in the range 4,000 A to 7,500 A, and at least one reducing agent capable of reducing the photosensitizer when the photosensitizer is in an activated state, the photosensitive catalyst being capable of curing the organic material to convert the impregnated fabric article into an immobilizing orthopaedic device upon exposure of the impregnated fabric article to said visible light.

2. An orthopaedic device as claimed in claim 1 in which the article is a bandage.

3. An orthopaedic device as claimed in claim 1 in which the article has an open structure.

4. An orthopaedic device as claimed in claim 1 in which the article is a glass fiber article.

5. An orthopaedic device as claimed in claim 1 in which the ethylenically unsaturated polymeric material is an ethylenically unsaturated polyester.

6. An orthopaedic device as claimed in claim 1 in which the article comprises from 10 to 60 percent of curable organic material by weight of the impregnated article.

7. An orthopaedic device as claimed in claim 6 in which the article comprises from 20 to 50 percent of curable organic material by weight of the impregnated article.

8. An orthopaedic device as claimed in claim 1 in which the photosensitive catalyst comprises at least one uranyl compound as photosensitizer.

9. An orthopaedic device as claimed in claim 8 in which the uranyl compound is uranyl nitrate.

10. An orthopaedic device as claimed in claim 1 in which the photosensitive catalyst comprises fluorenone as photosensitizer.

11. An orthopaedic device as claimed in claim 1 in which the photosensitive catalyst comprises at least one α-diketone photosensitizer having the structure $$A - \underset{\underset{O}{\|}}{C} - \underset{\underset{O}{\|}}{C} - A$$

in which the groups A, which may be the same or different, are hydrocarbyl groups or substituted hydrocarbyl groups.

12. An orthopaedic device as claimed in claim 11 in which the groups A are aromatic.

13. An orthopaedic device as claimed in claim 12 in which the photosensitive catalyst comprises benzil as photosensitizer.

14. An orthopaedic device as claimed in claim 11 in which the photosensitive catalyst comprises camphorquinone, α-naphthil or p-tolil as photosensitizer.

15. An orthopaedic device as claimed in claim 1 in which the reducing agent is a compound having the structure $$R_2 - \underset{\underset{}{\overset{R_2}{|}}}{M} - R_2$$

where M is an element of Group Vb of the Periodic Table of the Elements and the units $R_2$, which may be the same or different, are hydrogen atoms, hydrocarbyl groups, substituted hydrocarbyl groups or groups in which two units $R_2$ together with the element M form a cyclic ring system, no more than two of the units $R_2$ being hydrogen atoms, and where the element M is attached directly to an aromatic group $R_2$, at least one of the groups $R_2$ has a $$-\underset{\underset{H}{|}}{\overset{|}{C}}-$$

group attached to M.

16. An orthopaedic device as claimed in claim 15 in which the compound having the structure $$R_2 - \underset{\underset{}{\overset{R_2}{|}}}{M} - R_2$$

is free of aromatic groups attached directly to the element M.

17. An orthopaedic device as claimed in claim 15 in which the compound having the structure $$R_2 - \underset{\underset{}{\overset{R_2}{|}}}{M} - R_2$$

is a primary, secondary, or tertiary amine.

18. An orthopaedic device as claimed in claim 17 in which the amine is at least one of dimethylaminoethyl methacrylate, dimethylamino ethanol and dimethylamino propanol.

19. An orthopaedic device as claimed in claim 1 in which the photosensitizer is present in a concentration of 0.01 to 5 percent by weight of the curable organic material.

20. An orthopaedic device as claimed in claim 1 in which the curable organic material includes a pigment.

21. An orthopaedic device as claimed in claim 20 in which the pigment is titanium dioxide.

22. A method of forming an orthopaedic device on a body member which method comprises applying a fabric article as claimed in claim 1 to a body member so as to support and/or enclose the body member and irradiating the fabric article with visible light having a wavelength in the range 4,000 Å to 7,500 Å to cure the organic material with which the fabric article is impregnated.

23. An orthopaedic device forming fabric article for applying to a body member to immobilize the latter, said article comprising: a fabric impregnated with at least one curable organic material capable of reacting to produce a stiff rigid material, said organic material comprising a copolymerizable mixture of at least one ethylenically unsaturated polyester and at least one ethylenically unsaturated monomer; and at least one photosensitive catalyst comprising at least one α-diketone photosensitiser having the structure $$A - \underset{\underset{O}{\|}}{C} - \underset{\underset{O}{\|}}{C} - A$$

in which the groups A, which may be the same or different, are hydrocarbyl groups or substituted hydrocarbyl groups, said photosensitizer being activatable by visible light having a wave-length in the range 4,000 Å to 7,500 Å and the photosensitive catalyst being capable of curing the organic material to convert the impregnated fabric article into an immobilizing orthopaedic device upon exposure of the impregnated fabric article to said visible light.

24. An orthopaedic device as in claim 23 wherein the photosensitizer is benzil.

25. An orthopaedic device as in claim 24 wherein the photosensitive catalyst includes at least one reducing agent capable of reducing the photosensitizer when the latter is in an activated state.

26. An orthopaedic device as in claim 23 wherein the photosensitizer is selected from the group consisting of camphorquinone, α-naphthil and p-tolil.

27. An orthopaedic device as in claim 26 wherein the photosensitive catalyst includes at least one reducing agent capable of reducing the photosensitizer when the latter is in an activated state.

* * * * *

UNITED STATES PATENT OFFICE
CERTIFICATE OF CORRECTION

PATENT NO. : 3,874,376
DATED : April 1, 1975
INVENTOR(S) : Edward C. DART, Anthony R. PERRY and Josef NEMCEK It is certified that error appears in the above-identified patent and that said Letters Patent are hereby corrected as shown below:

-On the front page format, after paragraph "21", insert

--[30]  Foreign Application Priority Data
        Nov. 29, 1971  Great Britain ............. 55308/71--

Signed and sealed this 1st day of July 1975.

(SEAL)
Attest:

RUTH C. MASON
Attesting Officer

C. MARSHALL DANN
Commissioner of Patents
and Trademarks